March 17, 1959 W. B. WILSON 2,877,741

TRANSCRIBING ATTACHMENT

Filed Aug. 20, 1956 4 Sheets-Sheet 1

INVENTOR.
Warren Bev Wilson
BY
Greh Wells
Atty.

March 17, 1959 W. B. WILSON 2,877,741
TRANSCRIBING ATTACHMENT
Filed Aug. 20, 1956 4 Sheets-Sheet 2

INVENTOR.
Warren Bev Wilson
BY
Atty.

March 17, 1959 W. B. WILSON 2,877,741

TRANSCRIBING ATTACHMENT

Filed Aug. 20, 1956 4 Sheets-Sheet 3

INVENTOR.
Warren Bev. Wilson
BY Greekwells
Atty.

March 17, 1959
W. B. WILSON
2,877,741

TRANSCRIBING ATTACHMENT

Filed Aug. 20, 1956
4 Sheets-Sheet 4

INVENTOR.
Warren Bev. Wilson
BY
[signature]
Atty.

United States Patent Office 2,877,741
Patented Mar. 17, 1959

2,877,741

TRANSCRIBING ATTACHMENT

Warren Bev Wilson, Okanogan, Wash.

Application August 20, 1956, Serial No. 605,107

10 Claims. (Cl. 120—31)

The present invention relates to improvements in transcribing devices and more particularly to devices for use in transcribing shorthand recorder tapes.

In making verbatim reports of spoken words such as speeches, hearings, court proceedings, depositions, dictation and the like, reporters often make use of the well known shorthand recording machines. These machines type shorthand notes on long narrow paper tapes, typing a single word on each line of tape. The tape is usually fan folded back and forth upon itself to form a stack. While such machines are very efficient for shorthand recording, considerable difficulty is experienced in transcribing the notes recorded upon the tape. Since only a single word is typed on each line of the tape, a considerable length of tape is used to record even a few sentences. The transcriber must view several yards of tape to transcribed a single page. In transcribing it is necessary to have some sort of copy holder to hold the tape, and support a length thereof in position to be read. It is also necessary that the tape be moved frequently to expose a new area. If the transcriber must stop after each few sentences and manually move the tape, much time is wasted, and the transcribing process becomes expensive.

It is the principal purpose of the present invention to provide a transcribing device which will hold a stack of tape, keeping a length thereof exposed for reading, and which will advance the tape through the reading area automatically as the notes are transcribed.

A further purpose of the invention is to provide such a device wherein the tape advancing mechanism is actuated intermittently and automatically according to the progress made by the transcriber in transcribing the notes on a typewriter, by switch means actuated by a selected key of the typewriter.

A still further purpose of the invention is to provide a transcribing device in the form of attachments for an existing shorthand recorder whereby the mechanism of the recorder itself can be utilized to tend and advance the tape.

The invention comprises four general elements, a tape receiving tray, an easel portion for supporting a length of tape in a viewing position, a roller engaged with the tape and operable to drive it whereby to move it over the easel portion so that its full length may be viewed, and means for driving the roller intermittently according to the progress made by the transcriber.

It is contemplated that the device be provided in the form of attachments to be fitted to an existing shorthand recorder, the recorder itself providing the tape holding tray and the tape advancing roller, the easel member and driving mechanism being applied to the recorder to complete the device. The recorder, of course, functions only as a supporting frame and the only parts thereof actually utilized are the tape holding tray and the tape advancing means including the platen roller. The remainer of the machine performs no function. This being the case, it is obvious that the invention could be constructed as an independent unit without a shorthand recorder, by providing a frame having a tape holding tray and a tape advancing roller. In this case the easel member and the drive means would be permanently attached to the frame.

The nature and advantages of the invention will appear more clearly from the following description and the accompanying drawings. It should be understood, however, that the drawings and description are illustrative only and are not intended to limit the invention except insofar as it is limited by the claims.

Figure 1:
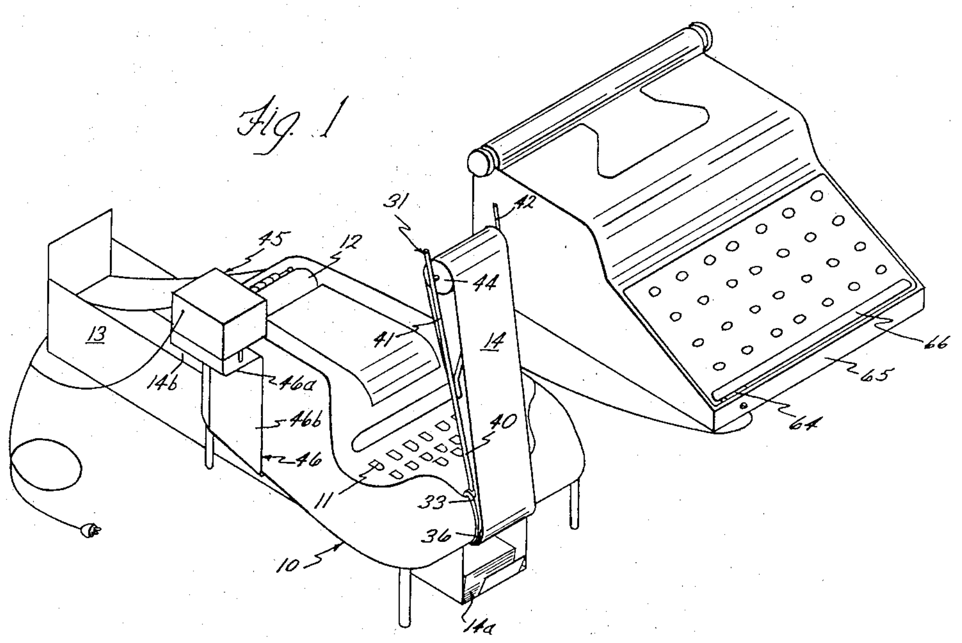
Figure 1 is a perspective view of the invention showing the transcribing device in operation.
Figure 7:
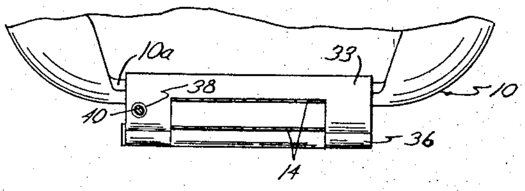
Figure 7 is an enlarged fragmentary sectional view taken on the line 7—7 of Figure 3.
Figure 2:
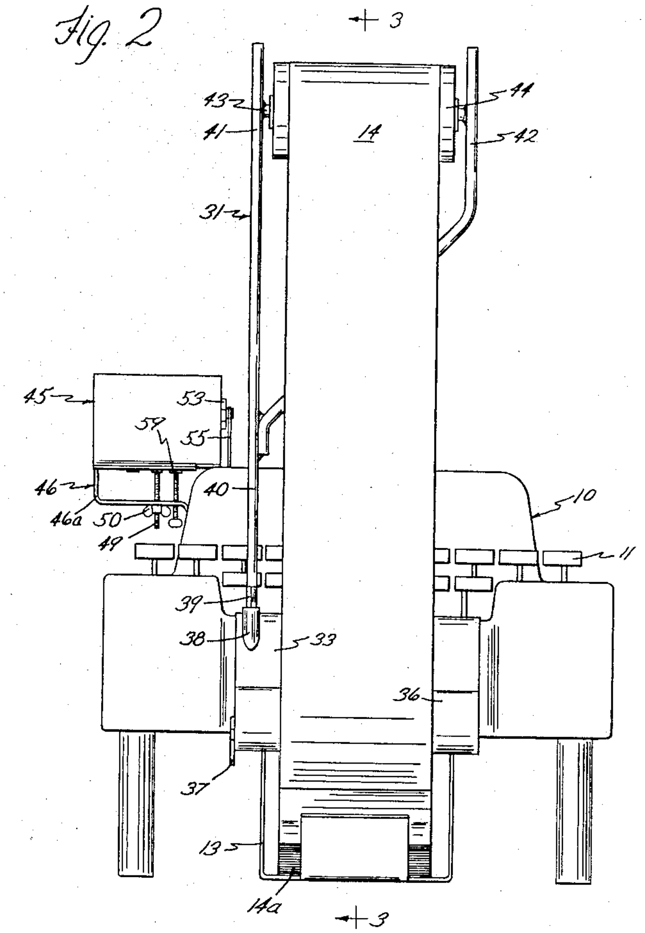
Figure 2 is a front elevational view of the device.
Figure 3:
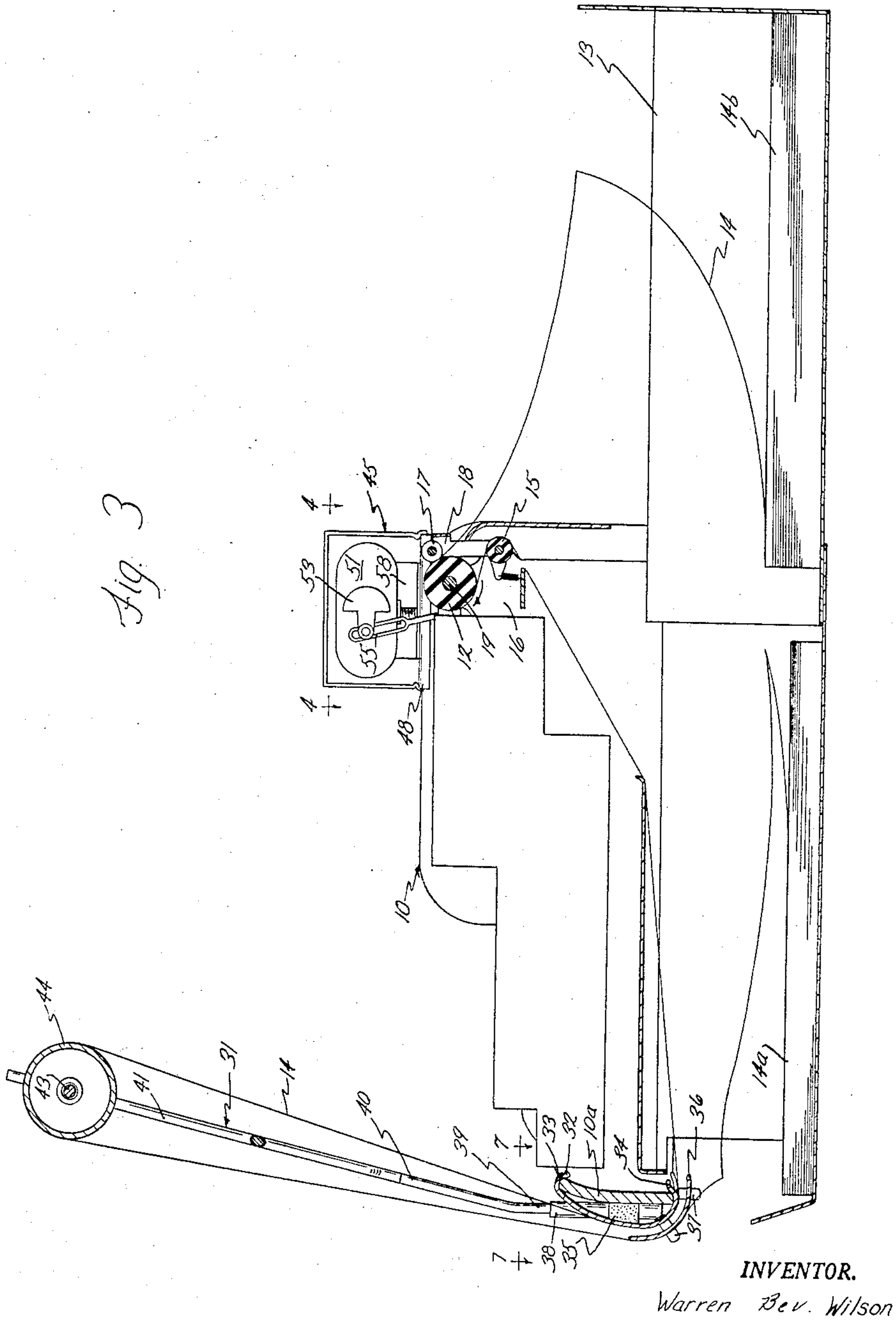
Figure 3 is a sectional view taken on the line 3—3 of Figure 2.
Figure 4:
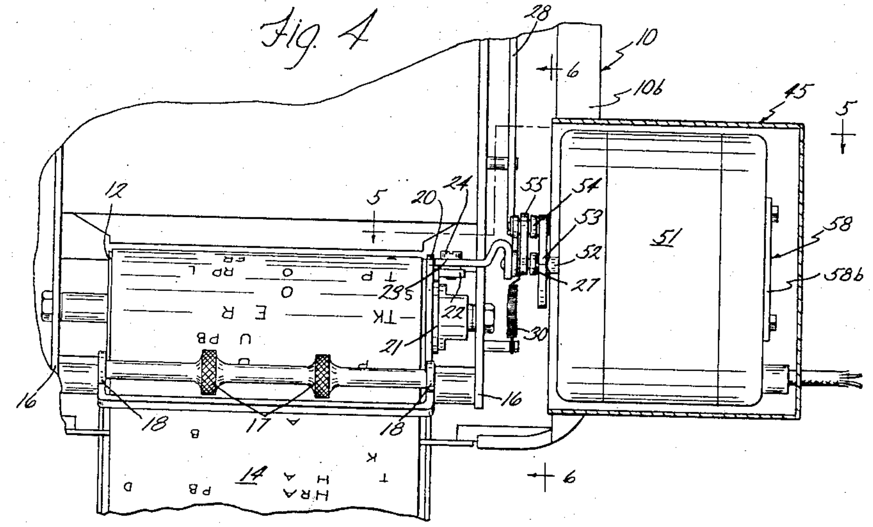
Figure 4 is an enlarged fragmentary plan view taken on the line 4—4 of Figure 3.

Referring now to the drawings, and to Figures 1, 2 and 3 in particular, the invention is shown as embodied in a shorthand recording machine 10, having certain attachments thereon. The machine 10 is of the type utilizing a paper tape to record shorthand notes. The particular machine illustrated in the drawings is a "Stenotype" made and sold by the Stenotype Company of Chicago, Illinois. The machine 10 has a keyboard 11, the keys of which actuate typing hammers (not shown) which in turn strike through an inked ribbon (not shown) against a platen roller 12. The machine 10 includes a paper tape holding tray 13 which holds the recording tape shown at 14. The tray is extensible so that it will hold two stacks of paper tape 14, a stack **14*a* at the front from which the tape is fed into the machine 10, and a stack 14*b* at the rear into which the tape 14 forms after having passed through the machine 10. In normal operation of the machine 10, the tape 14 is led up from the stack 14*a* over an idler roller 15 mounted between frame members 16 in the machine 10, and then around the platen roller 12. From the platen roller 12, the tape 14 is led down into the tray 13 to form the stack 14*b*. Guide rollers 17, carried by arms 18 pivoted to the supporting shaft for the idler rollers 15 guide the tape downward into the stack 14*b*. The tape is advanced through the machine 10 by rotation of the roller 12** in the direction indicated in Figure 3.

Figure 5:
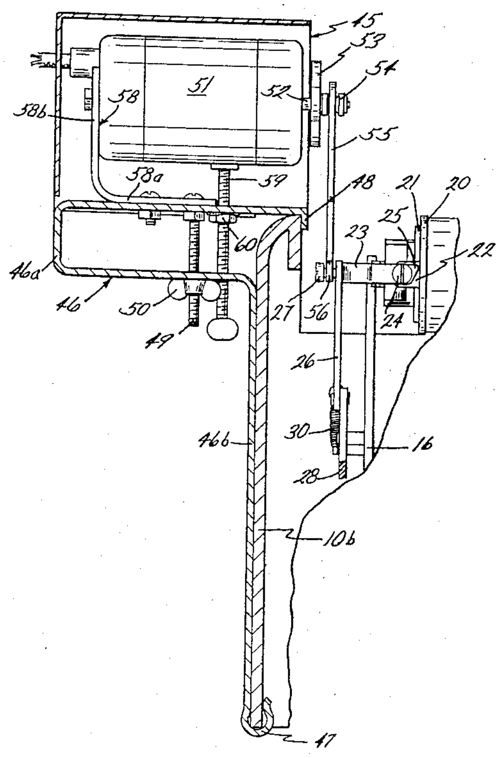
Figure 5 is a sectional view taken on the line 5—5 of Figure 4.
Figure 6:
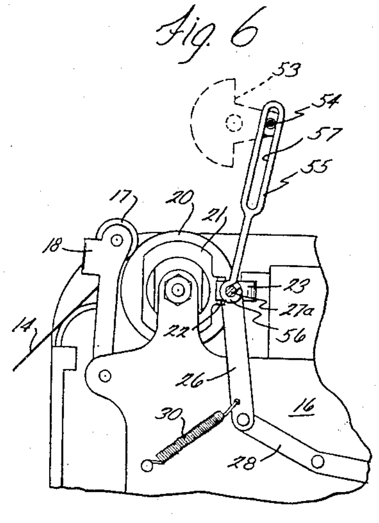
Figure 6 is a sectional view taken on the line 6—6 of Figure 4.

The platen roller 12 is rotatably mounted on a shaft 19 supported between the frame members 16 of the machine 10. The roller 12 has a friction plate 20 fixed to one end thereof. Adjacent the friction plate 20 a pivot plate 21 is mounted on the shaft 19. The pivot plate 21 has a turned out ear 22 thereon to which an arm 23 is pivoted by a screw 24. The arm 23 has a finger portion 25 thereon which extends toward the friction plate 20, as best shown in Figure 5. If the arm 23 is moved upwardly a short distance, the finger 25 is pivoted into engagement with the friction plate 20. Further upward movement of the arm 23 causes the pivot plate 21 to rotate on the shaft 19, and because the finger 25 is wedged against the friction plate 20, also causes the platen roller 12 to rotate. When the arm 23 is moved downwardly, however, the finger 25 is pivoted away from the friction plate 20, and the arm 23 and pivot plate 21 rotate in a reverse direction without moving the roller 12. With this construction, vertical reciprocal movement of the arm 23 will cause the roller 12 to rotate in steps to advance the tape 14 through the machine 10. In normal operation of the machine 10, the arm 23 is moved by a link 26 pivoted by a screw 27 to the free end of the arm 23. The link 26 is connected to a lever 28 which is actuated to move the link 26 upwardly each time a key is depressed on the keyboard 11. Thus each time a key or combination of keys are pressed, the roller 12 is rotated a few degrees to advance the tape 14. A spring 30 is connected between the link 26 and the adjacent frame member 16 to return the link 26, arm 23 and pivot plate 21 to normal position after each advance. The parts thus far described are all standard parts of the shorthand recording machine and except insofar as they combine with the other elements of the invention, are not intended as part of the invention.

When the machine 10 is to be utilized as part of the invention, an easel attachment, generally indicated by the numeral 31, is secured to the front edge. The attachment 31, best shown in Figures 1, 2, 3 and 7, comprises a curved plate 32 which has its upper edge turned down to form a spring clip 33 and has a portion of its bottom edge turned upwardly to form a spring clip 34. The plate 32 is adapted to be fitted to the front wall 10*a* of the recording machine 10, the clips 33 and 34 engaging the top and bottom edges of the wall 10*a* as shown in Figure 3, to secure the plate 32 in place. A sponge rubber strip 35 fixed to the plate 32 presses against the wall 10*a* to assist the clips 33 and 34 in supporting the plate 32. As shown in Figure 3, the plate 32 extends downwardly and inwardly beneath the wall 10*a* and above the front edge of the tray 13 forming a smooth curved surface. A second plate 36 is also provided, it being spaced a short distance in front of the plate 32 and supported at one edge by two ears 37 extending outwardly from the plate 32. The plate 36 extends substantially parallel to the plate 32 downwardly and rearwardly beneath the front wall 10*a* of the machine 10. Adjacent one edge of the plate 31, an upright tube 38 is provided. The tube 38 is fixed to the plate 32 as shown in Figures 2 and 3. The tube 38 has a squared aperture therein into which the squared end 39 of a post 40 is supported. The post 40 extends upwardly and is bifurcated at its upper end to provide two vertical arms 41 and 42. A cross arm 43 is fixed between the arms 41 and 42 and rotatably mounts a roller 44.

The stack 14*a* of tape 14 containing the notes to be transcribed is placed in the front of the tray 13. The tape 14 is led from the stack 14*a* forwardly around the outer curved plate 36 and up over the roller 44 supported by the post 40. The tape 14 is then led down between the plates 32 and 36 and rearwardly under the machine 10 to the idler roller 15. The tape 14 is threaded around the roller 15 and platen roller 12 in the same manner as it is threaded for normal operation of the machine 10. With the tape 14 so threaded, rotation of the platen roller 12 will cause the tape to be advanced from the stack 14*a* to the second stack 14*b*. The easel attachment 31, including the elements 32—44, provides a run of tape 14 extending upwardly from the stack 14*a* in front of the machine 10 in position to be easily read. As the tape 14 is advanced through the machine 10, each portion thereof passes upwardly from the stack 14*a* to the roller 44, being exposed to the transcriber in the space therebetween.

In order to advance the tape through the machine, a second attachment generally indicated at 45 is provided. The attachment 45 comprises a bracket 46 which is adapted to be clamped onto the side wall 10*b* of the machine 10 adjacent the platen roller 12. The bracket 46 has an upper C-shaped portion 46*a* and a vertical portion 46*b* therebeneath. The portion 46*b* has its bottom edge turned up as shown at 47 in Figure 5 so that it can be hooked under the lower edge of the side wall 10*b*. The upper C-shaped portion 46*a* has a down turned lip 48 thereon which is adapted to be hooked over the top edge of the wall 10*b*. A pair of bolts 49 are extended between the horizontal portions of the C-shaped portion 46*a* of the bracket 46. Wing nuts 50 are threaded on the bolts 49 and operate to squeeze the horizontal portions of the C-shaped portion 46*a* together when tightened, whereby to force the lip 48 toward the bottom turned up edge 47 and clamp the bracket 46 in place.

The bracket 46 supports an electric motor 51 which is utilized to advance the tape 14. The motor 51 has a drive shaft 52 to which a crank arm 53 is fixed. The crank arm 53 has a spool 54 rotatably mounted at its outer end. A reciprocating arm 55 is provided to connect the crank arm 53 to the arm 23 which advances the platen roller 12 as hereinbefore described. The arm 55 has a spring hook 56 at its lower end which is adapted to be clipped onto a shank portion 27*a* of the screw 27 which is carried at the outer end of the arm 23. The arm 55 has an elongated slot 57 at its upper end which receives the spool 54 on the crank arm 53. With this construction, rotation of the crank arm 53 will cause the spool 54 to traverse the slot 57 in the arm 55 and depending upon the height of the shaft 52 above the platen roller actuating arm 23, will cause the actuating arm 23 to be moved up and down more or less to advance the plate roller 12.

To control the amount of advancement of the platen roller 12 for each revolution of the motor shaft 52, means are provided to vary the height of the motor 51 above the machine 10. As shown best in Figure 5, the motor 51 is mounted on the bracket 46 by a spring metal bracket 58 having a horizontal leg 58*a* secured to the bracket 46, and a vertical leg 58*b* secured to the motor 51 at the end thereof opposite the crank arm 53. The bracket 58 supports the motor 51 for limited vertical movement above the machine 10, the weight of the motor tending to move it downwardly. A positioning screw 59 is provided on the C-shaped portion 46*a* of the bracket 46 to adjust the height of the motor 51. The screw 59 threads through a nut 60 fixed on the portion 46*a* of the bracket 46 as shown in Figure 5 and bears upwardly against the motor 51. As the screw 59 is threaded up and down through the nut 60, it raises and lowers the motor on its spring mounting bracket 58. When the motor 51 is positioned so that the shaft 52 is at a level above the platen roller actuating arm 23 equal to the length of the reciprocating arm 55, rotation of the crank arm 53 will lift the arm 55 a distance equal to the radial length of the crank arm 53, and will advance the roller 12 a certain corresponding distance. If the motor is lowered by adjusting the positioning screw 59 downwardly, rotation of the crank arm 53 will lift the arm 55 a lesser amount and shorten the advance of the roller 12. Raising of the motor 51 by adjusting the screw 59 upwardly will cause the arm 55 to be raised a greater distance and lengthen the advance of the roller 12.

Figure 8:
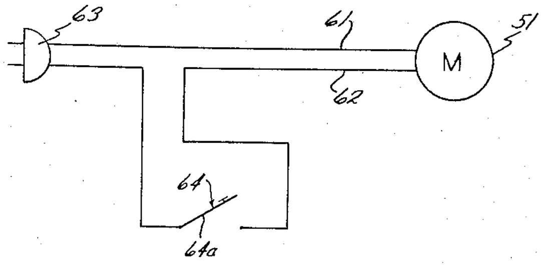
Figure 8 is an electrical diagram showing the control circuit for the device.

The motor 12 is supplied with power through power leads 61 and 62 as shown in Figure 8, which power leads connect to a plug 63 suitable for connection with a standard electrical outlet. The lead 62 has a switch 64 therein which may be operated to energize the motor 51. The switch 64 is preferably a micro switch spring pressed to open position and closed by a slight pressure on its operating lever 64*a*. With this construction, the operator may advance the tape 14 through the machine 10 by holding the switch closed. The length of time the switch is held closed, together with the adjustment of the motor positioning screw 59 determines the amount of advancement of the tape 14.

Figure 9:
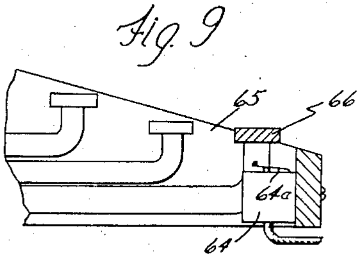
Figure 9 is an enlarged fragmentary sectional view of the typewriter shown in Figure 1, illustrating the connection of the motor control switch thereto.

In order to obviate the necessity of manually operating the switch 64 during the transcribing process, and to provide for automatic advancement of the tape 14 according to transcribing progress, the switch 64 is adapted to be mounted on a typewriter such as shown at 65, beneath a selected key, as shown in Figure 9, so that the tape 14 is advanced a short distance each time the key is struck. I have found that if the switch 64 is mounted beneath the space bar 66 of the typewriter 65 (see Figure 9) where it is momentarily closed at the end of each word transcribed, the advance of the tape 14 through the machine 10 will correspond closely to the progress of the transcriber so that the particular portion of the tape being transcribed always remains in the reading area between the stack 14a and the roller 44. The switch 64 may, of course, be mounted beneath any desired key. If the transcriber prefers, the switch 64 may be placed under an infrequently used key on the typewriter 65 and the positioning screw 59 of the motor 51 moved to the maximum upward position so that the tape 14 is advanced a maximum distance each time the infrequently used key is struck. If the transcriber desires, the switch 64 may be placed beneath a frequently used key such as the "a" or "e" and the positioning screw 59 adjusted to give a minimum advance for each revolution of the motor 51. My invention allows considerable adjustment of the speed of tape advance to meet the circumstances of all cases.

It should be apparent that my invention provides a simple and economical transcribing device which may be quickly set up to assist the transcriber by tending and advancing the tape 14 through the viewing area in accordance with the actual progress made and without any attention from the transcriber. Since the device utilizes the existing recording machine, it is extremely economical. The device may be easily stored and transported with the machine.

While the drawings illustrate the invention in the form of attachments for an existing shorthand recording machine, it is obvious that it may be constructed in the form of an independent device in which case the tape holding tray would form the main supporting frame and would have the platen roller 12 and associated actuating mechanism including elements 15—27 mounted directly thereto. The easel attachment 31 and the driving mechanism attachment 45 would be permanently incorporated with the tape holding tray to complete the device. The operation would be identical to that of the device hereinbefore described.

It is believed that the nature and advantages of the invention will appear clearly from the foregoing description.

Having thus described my invention, I claim:

1. In combination with a shorthand recorder comprising a main supporting frame having a tape holding tray therein, a roller journalled in said frame and a clutch member adjacent the roller, the clutch member including an actuating arm operable when moved in one direction to engage the clutch member and rotate the roller and operable when moved in the opposite direction to disengage the clutch member from the roller whereby to rotate the clutch member in a reverse direction without driving the roller, the transcribing attachment means operable upon attachment to the recorder to condition said recorder for use as a copyholder, said attachment means comprising an easel member separably mounted on the frame and extending thereabove, the easel member having spaced apart guide members secured to the frame, the recorder tape being stacked in the tray and extending around one of said guide members thence upwardly over the easel member thence downwardly around the other of said guide members and into driving engagement with the roller whereby to be advanced over the easel upon rotation of the roller, and means to reciprocate the actuating arm whereby to advance the tape, said means including a motor, a crank driven by the motor, and a connecting arm connecting the crank to the actuating arm, the motor having power leads extending therefrom to a power source, and a switch in one of said leads.

2. In combination with a shorthand recorder including a main supporting frame having a tape holding tray therein, a roller journalled in said frame, and means operable to rotate the roller including an actuating arm operable when moved in one direction to engage and rotate the roller and operable when moved in the opposite direction to disengage from the roller, transcribing attachment means operable upon attachment to the recorder to condition the recorder for use as a copyholder, said attachment means comprising an easel member supported on the frame and extending thereabove, the tape being stacked in the tray and extended upwardly over the easel member and into driving engagement with the roller, a bracket supported on the main frame, an electric motor mounted on the bracket, said motor having a drive shaft, a crank arm fixed to the drive shaft, a connecting arm connecting said crank arm to the actuating arm whereby to reciprocate the actuating arm upon rotation of the crank arm and drive the roller to advance said tape over the easel, and a control switch connected to the motor.

3. In combination with a shorthand recorder including a main supporting frame having a tape holding tray therein, a roller journalled in said frame, and means operable to rotate the roller including an actuating arm operable when moved in one direction to engage and rotate the roller and operable when moved in the opposite direction to disengage from the roller, transcribing attachment means operable upon attachment to the recorder to condition said recorder for use as a copyholder, said attachment means comprising an easel member supported on the frame and extending thereabove, the tape being stacked in the tray and extended upwardly over the easel member and into driving engagement with the roller, a bracket supported on the main frame, a motor mounted on the bracket for limited movement toward and away from the roller actuating arm, means on the bracket to adjust the motor toward and away from the roller actuating arm, the motor having a drive shaft, a crank arm fixed to the drive shaft, a connecting arm pivotally secured to the roller actuating arm and having an elongated slot therein, a spool fixed to the outer end of the crank arm and received in said slot in the connecting arm whereby to reciprocate the connecting arm and actuating arm upon rotation of the crank arm and drive the roller to advance said tape over the easel, and a control switch connected to the motor.

4. In combination with a shorthand recorder including a main supporting frame having a tape holding tray therein, a roller journalled in said frame, and means operable to rotate the roller including an actuating arm operable when moved in one direction to engage and rotate the roller and operable when moved in the opposite direction to disengage from the roller, transcribing attachment means operable upon attachment to the recorder to condition the recorder for us as a copyholder, said attachment means comprising an easel member supported on the frame and extending thereabove, the tape being stacked in the tray and extended upwardly over the easel member and into driving engagement with the roller, a bracket supported on the main frame, a flexible supporting bracket fixed to said first named bracket, a motor secured to said flexible supporting bracket, a screw threaded in said first named bracket and engaging the motor whereby to adjust the motor toward or away from the roller actuating arm, the motor having a drive shaft, a crank arm fixed to the drive shaft, a connecting arm pivotally secured to the roller actuating arm and having an elongated slot therein, a spool fixed to the outer end of the crank arm and received in said slot in the connecting arm whereby to reciprocate the connecting arm and actuating arm upon rotation of the crank arm and drive the roller to advance said tape over the easel, and a control switch connected to the motor.

5. In combination with a shorthand recorder having a main frame, a tape holding tray for holding recorder tape, a platen roller journalled in the main frame and means to rotate the platen roller including an actuating arm operable when moved in one direction to rotate the roller, and operable when moved in the opposite direction to disengage from the roller, transcribing attachment means for holding and advancing shorthand recorder tape through the recorder and through a viewing area, said attachment means comprising a motor supported on the frame adjacent the actuating arm, the motor having a drive shaft, a crank arm fixed to the drive shaft, a connecting arm connected between the crank arm and the actuating arm whereby to reciprocate the actuating arm upon rotation of the crank arm, and a control switch for the motor, an easel member separably mounted on the frame above the tape holding tray, said easel member comprising a pair of spaced apart parallel curved guide plates, an upright member supported on one of said guide plates, and an idler roller journalled in the upright member at the upper end thereof, the tape being stacked in the tape holding tray and extending therefrom around one of said curved guide plates thence upwardly over the idler roller then downwardly between said curved guide plates thence into driving engagement with the first named roller whereby to be advanced from said stack in the tray over the easel member upon rotation of the first named roller.

6. In combination with a shorthand recorder having a main frame, a tape holding tray for holding recorder tape, a platen roller journalled in the main frame and means to rotate the platen roller including an actuating arm operable when moved in one direction to rotate the roller, and operable when moved in the opposite direction to disengage from the roller, transcribing attachment means for holding and advancing shorthand recorder tape through the recorder and through a viewing area, said attachment means comprising an easel including a clamping member securing the easel to the recorder frame, an upright member secured to the clamp member, and tape guide means on the clamp member, the recorder tape being stacked in the tape holding tray and extending therefrom over the guide means, thence upwardly over the upright member, then downwardly around the guide means, thence into driving engagement with the platen roller, and a drive mechanism having a bracket clamped to the recorder frame, a motor supported on the bracket, said motor having a drive shaft, a crank arm fixed to the drive shaft, a connecting arm connected between the crank arm and the platen roller actuating arm, the connecting arm operable to reciprocate the platen roller actuating arm upon rotation of the motor whereby to rotate the platen roller and advance the tape over the easel member, and a control switch for the motor.

7. In combination with a shorthand recorder having a main frame, a tape holding tray for holding recorder tape, a platen roller journalled in the main frame and means to rotate the platen roller including an actuating arm operable when moved in one direction to rotate the roller, and operable when moved in the opposite direction to disengage from the roller, transcribing attachment means for holding and advancing shorthand recorder tape through the recorder and through a viewing area, said attachment means comprising an easel including a curved guide plate having clamp means thereon, said plate being clamped to the frame adjacent the front end of the tape holding tray, a second curved plate supported on the first named plate and spaced therefrom, and an upright member secured to the first named plate, said upright member having a roller journalled at its upper end, the recorder tape being stacked in the tray and extending therefrom over said second curved plate, thence upwardly over the roller journalled in the upright member, thence downward between the first and second curved plates, thence into driving engagement with the platen roller, and a drive mechanism having a bracket clamped to the frame of the recorder, a motor mounted on the bracket for limited movement thereon toward and away from the platen roller, means on the bracket to adjust the motor toward and away from the platen roller, the motor having a drive shaft, a crank arm fixed to the drive shaft, and a connecting arm pivotally secured to the platen roller actuating arm and having an elongated slot therein, a spool fixed to the outer end of the crank arm and received in the slot in said connecting arm whereby to reciprocate the connecting arm to rotate the platen roller and advance the tape over the easel upon operation of the motor, and a control switch connected to the motor.

8. In combination with a shorthand recorder having a main frame, a tape holding tray, a platen roller journalled in the frame and means to rotate the platen roller including an actuating arm operable when moved in one direction to engage and rotate the roller and operable when moved in the opposite direction to disengage from the platen roller, shorthand recorder tape being stacked in the tray and extending therefrom into driving engagement with the platen roller, an attachment for driving the roller comprising a bracket clamped to the main frame, a motor mounted on the bracket for limited movement toward and away from the roller, means on the bracket to adjust the motor toward and away from the roller actuating arm, the motor having a drive shaft, a crank arm fixed to the drive shaft, a connecting arm pivotally secured to the roller actuating arm and having an elongated slot therein, a spool fixed to the outer end of the crank arm and received in said slot in the connecting arm whereby to reciprocate the connecting arm and actuating arm upon rotation of the crank arm to rotate the roller and advance the tape, and a control switch connected to the motor.

9. In combination with a shorthand recorder having a main frame, a tape holding tray, a platen roller journalled in the frame and means to rotate the platen roller including an actuating arm operable when moved in one direction to engage and rotate the roller and operable when moved in the opposite direction to disenagage from the platen roller, shorthand recorder tape being stacked in the tray and extending therefrom into driving engagement with the platen roller, an attachment for driving the roller comprising a bracket clamped to the main frame, a flexible supporting bracket fixed to said first named bracket, a motor secured to said flexible supporting bracket, a screw threaded into said first named bracket and engaging the motor whereby to adjust the motor toward or away from the roller actuating arm, the motor having a drive shaft, a crank arm fixed to the drive shaft, a connecting arm pivotally secured to the roller actuating arm and having an elongated slot therein, a spool fixed to the outer end of the crank arm and received in said slot in the connecting arm whereby to reciprocate the connecting arm and actuating arm upon rotation of the crank arm to rotate the roller and advance the tape, and a control switch connected to the motor.

10. In combination with a shorthand recorder having a main frame, a tape holding tray, a platen roller journalled in the frame and means to rotate the platen roller including an actuating arm operable when moved in one direction to engage and rotate the roller and operable when moved in the opposite direction to disengage from the platen roller, an easel attachment for providing a tape viewing area above the recorder for transcribing the tape, said attachment comprising a pair of spaced apart parallel curved guide plates, an upright member supported on one of said guide plates, and an idler roller journalled in the upright member at the upper end thereof, shorthand recorder tape being stacked in the tape holding tray and extending therefrom around one of said curved guide plates, thence upwardly over the idler roller, thence downwardly between said curved guide plates, thence into driving engagement with the first named roller whereby to be advanced from said stack in the tray over the easel member upon rotation of the first named roller.

References Cited in the file of this patent

UNITED STATES PATENTS

| | | |
|---|---|---|
| 2,166,508 | Shipley et al. | July 18, 1939 |
| 2,216,334 | Akin | Oct. 1, 1940 |
| 2,462,273 | Metcalf | Feb. 22, 1949 |
| 2,530,702 | Johnson | Nov. 21, 1950 |
| 2,565,295 | Booten | Aug. 21, 1951 |
| 2,737,156 | Denver | Mar. 6, 1956 |
| 2,747,547 | Drasher | May 29, 1956 |